United States Patent
Nied et al.

[11] Patent Number: 5,165,589
[45] Date of Patent: * Nov. 24, 1992

[54] CONCURRENT FRICTION/JOULE HEATING WELD PROCESS

[75] Inventors: Herman A. Nied, Ballston Lake; Robert E. Sundell, Clifton Park, both of N.Y.

[73] Assignee: General Electric Company, Schenectady, N.Y.

[*] Notice: The portion of the term of this patent subsequent to Oct. 20, 2009 has been disclaimed.

[21] Appl. No.: 718,042

[22] Filed: Jun. 20, 1991

[51] Int. Cl.⁵ ............... B23K 11/00; B23K 20/12
[52] U.S. Cl. ............... 228/102; 228/176; 228/112; 228/2; 228/9
[58] Field of Search ............... 228/102, 2, 9, 110, 228/112, 113, 176, 200, 240, 1.1, 4.5, 179; 219/101, 104; 324/713, 715

[56] References Cited

U.S. PATENT DOCUMENTS

| | | | |
|---|---|---|---|
| 3,714,509 | 1/1973 | Coleman et al. | 361/242 |
| 3,763,545 | 10/1973 | Spanjer | 228/110 |
| 3,888,405 | 6/1975 | Jones et al. | 228/2 |
| 3,998,373 | 12/1976 | Jones et al. | 228/9 |
| 4,213,556 | 7/1980 | Persson et al. | 228/104 |
| 4,441,248 | 4/1984 | Sherman et al. | 228/104 |
| 4,555,052 | 11/1985 | Kurtz et al. | 228/4.5 |
| 4,596,917 | 6/1986 | Nied et al. | 219/109 |
| 4,705,204 | 11/1987 | Hirota et al. | 228/179 |
| 4,721,947 | 1/1988 | Brown | 228/56.5 |
| 4,998,663 | 3/1991 | Cakmak et al. | 228/2 |

FOREIGN PATENT DOCUMENTS

| | | | |
|---|---|---|---|
| 2837284 | 3/1979 | Fed. Rep. of Germany | 228/102 |
| 41-20690 | 12/1966 | Japan | 228/2 |
| 0688309 | 9/1976 | U.S.S.R. | 228/114 |
| 660799 | 5/1979 | U.S.S.R. | 228/110 |

*Primary Examiner*—Richard K. Seidel
*Assistant Examiner*—Jeanne M. Elpel
*Attorney, Agent, or Firm*—James R. McDaniel

[57] ABSTRACT

In order to control the cooldown temperature of a weld produced by a friction welding process, an electrical signal having a low voltage and a high current is passed through the weld thereby providing desired metallurgical properties. The weld acts as a resistor due to its high temperature as compared to the surrounding material such that the current causes the weld to heat up when the current passes through the weld and also causes the electrical signal to change as it passes through the weld. The change in current can be measured and the temperature of the weld can be controlled which allows the cooldown of the weld to be properly maintained for the desired metallurgical properties.

8 Claims, 2 Drawing Sheets

CONCURRENT FRICTION/JOULE HEATING WELD PROCESS

CROSS REFERENCE TO RELATED APPLICATIONS

This application is related to commonly assigned U.S. patent application Ser. No. 07/718,041, entitled "FRICTION WELDING TEMPERATURE MEASUREMENT AND PROCESS CONTROL SYSTEM".

BACKGROUND OF THE INVENTION

1. Field of the Invention

This invention relates to a friction welding process and temperature control systems. Such structures of this type generally allow the temperature of the weld formed by friction welding to be accurately controlled such that the welding process can be more precisely controlled which, ultimately, produces repeatable good welds and desired metallurgical properties.

2. Description of the Related Art

Friction welding is quickly becoming the desired technique used to weld high temperature materials together including advanced composites. However, in order to properly perform a friction weld, the temperature at the interface between the materials must reach a suitable value but be below the melting temperature, and the weld must be cooled in a controlled manner in order to avoid producing adverse intermetallic structures in the weld which could make the weld brittle. It is well known that friction welding produces a very narrow process or heat affected zone, hereinafter, referred to as a HAZ. This occurs due to the highly localized heating at the interface of the components to be joined. In the friction welding process, the intense but short duration of mechanical energy dissipation at the material interface surfaces produced by the high strain rate deformation generates a rapid increase in temperature. Typically temperatures reach over 1000° F. followed by an extremely rapid quenching action due to heat conduction into the surrounding material. This rapid heat cooldown has a tremendous influence on the microstructure generated in the narrow process zone producing a brittle martensitic type structure in certain alloys such as titanium. Therefore, a more advantageous system, then, would be presented if the cooldown of the weld could be controlled.

It is apparent from the above that there exists a need in the art for a temperature control system which measures and controls the weld temperature of a friction weld in an unobtrusive manner and, in particular, controls the weld cooldown to avoid the production of intermetallics in the weld.

SUMMARY OF THE INVENTION

Generally speaking, this invention fulfills these needs by providing a friction welding temperature control system having a friction welding means which produces a friction weld, comprising a temperature sensing means electrically attached to said welding means providing an electrical signal, an additional heating provided by joule heating, and a control means which processes said electrical signal to control a cooldown rate of said friction weld.

In certain preferred embodiments, the temperature measuring means and heating means are a power supply having a high current and a low voltage. Also, the control means is an electrical feedback and a microprocessor.

In another further preferred embodiment, the cooldown of the friction weld is controlled in an unobtrusive manner.

The preferred friction welding temperature measurement and process control system, according to this invention, offers the following advantages: good stability; improved temperature control; improved metallurgical properties; ease of temperature control; good economy; repeatable weld quality; and high strength for safety. In fact, in many of the preferred embodiments, these factors of improved temperature control, ease of temperature control, repeatable weld quality and metallurgical properties are optimized to an extent considerably higher than heretofore achieved in prior, known friction welding temperature control systems.

BRIEF DESCRIPTION OF THE DRAWINGS

The above and other features of the present invention which will become more apparent as the description proceeds are best understood by considering the following detailed description in conjunction with the accompanying drawings wherein like characters represent like parts throughout the several views and in which.

DETAILED DESCRIPTION OF THE INVENTION

Figure 1:
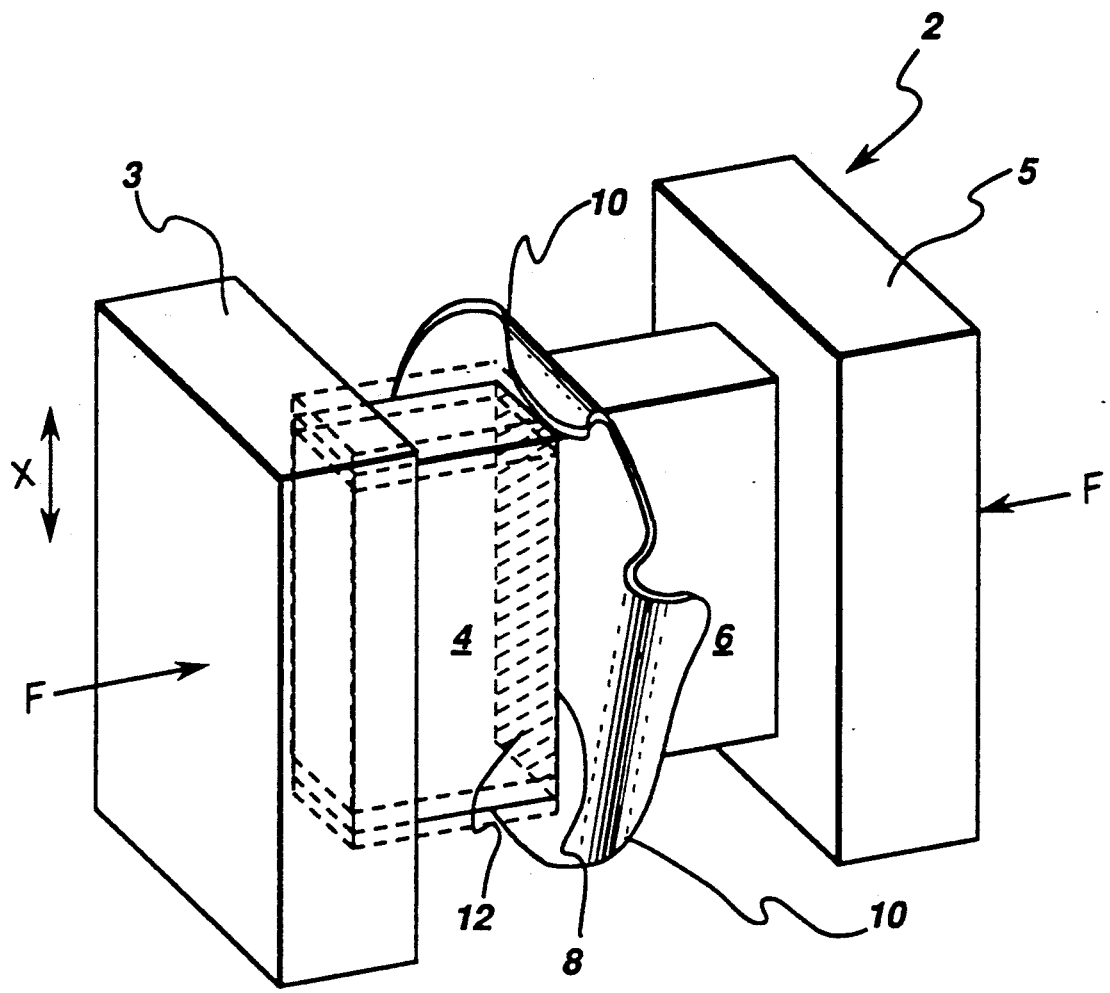
FIG. 1 is a schematic drawing of a conventional linear reciprocating friction welding process.

With respect to FIG. 1, there is illustrated a schematic representation of a conventional linear reciprocating friction welding apparatus 2. In particular, apparatus 2 includes a component 4 attached to an oscillating head stock 3, a mating component 6 attached to a stationary tail stock 5, friction weld interface 8, flash 10 and HAZ 12. A force F, typically around 10,000 pounds, is placed on stocks 3,5 while head stock 3 oscillates along direction X, preferably, between 10-90 Hz. It is to be understood that while linear reciprocating friction welding is being illustrated, it is illustrated only as an example, for the present invention is applicable in all types of friction welding, for example, continuous rotational friction welding, inertia friction welding, friction surfacing and orbital friction welding.

As mentioned earlier, it is important to measure the temperature in HAZ 12 in order to be certain that the process parameters will produce the proper temperature, and, ultimately, the proper cooldown at the interface between components 4,6. It has been determined that the narrow weld region or HAZ 12 has a significantly higher electric resistance compared to the rest of the material surrounding HAZ 12. The present invention employs the dynamic resistance in the HAZ 12 as the process variable to provide an accurate control of the temperature of HAZ 12 both during heat up and cooldown.

Figure 2:
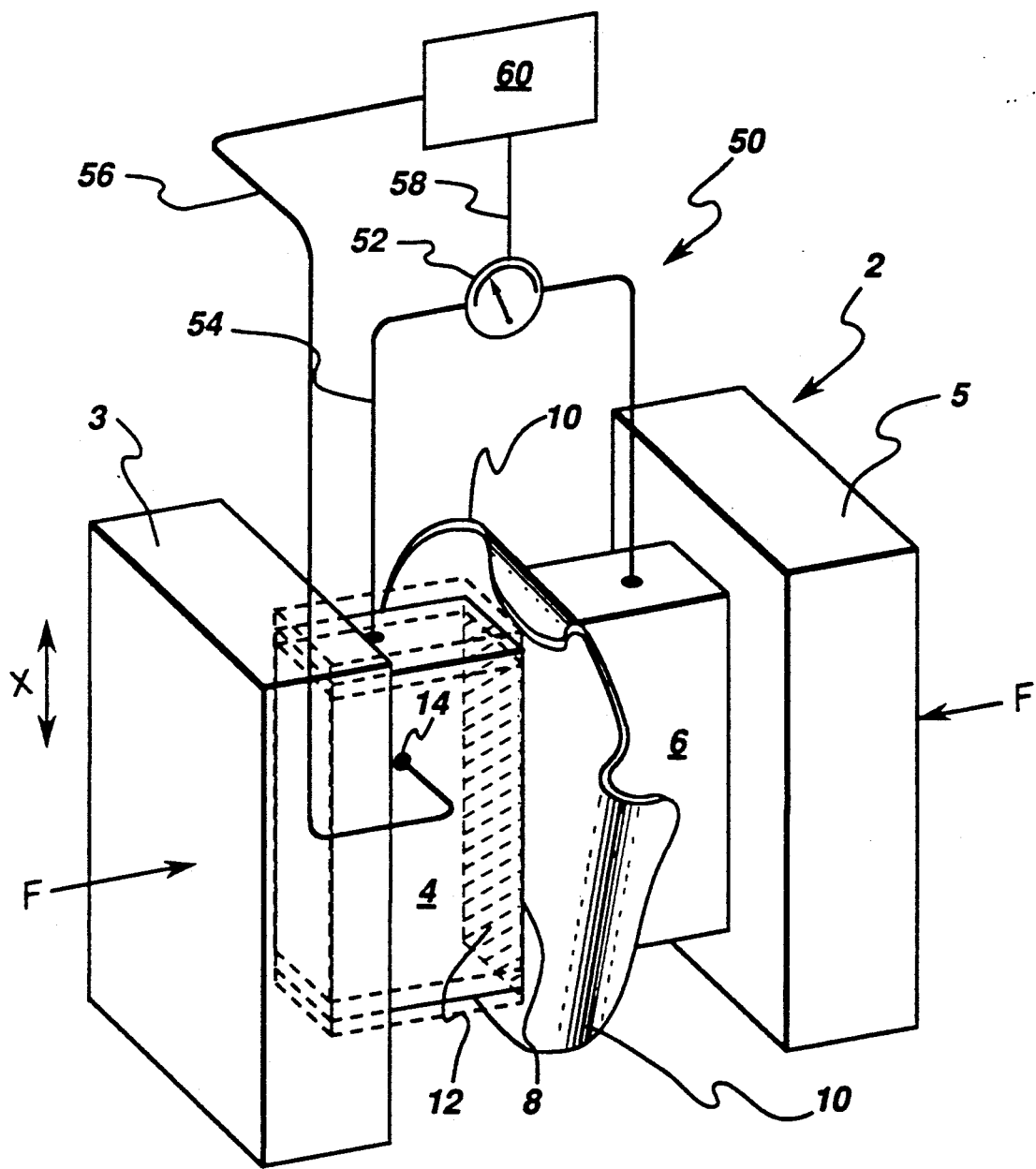
FIG. 2 is a schematic drawing of a friction welding temperature control system, according to the present invention.

FIG. 2 shows a friction welding temperature control system 50. System 50 includes friction welding apparatus 2, a conventional thermocouple 14, AC/DC voltage supply 52, conventional electrical leads 54,58 and process controller 60. In particular, power source 52 must be constructed such that it will deliver a low voltage, preferably, 3-4 volts and a high current, preferably, around 1000 amps depending on the weld area. Process controller 60 includes a conventional microprocessor having a dynamic feedback control system. Process controller 60 is similar to the multivariable process monitor and diagnostic system disclosed in commonly assigned U.S. Pat. No. 4,596,917. Thermocouple 14 which is electrically connected to controller 60 is used as a backup device for sensing the temperature near weld 8.

In operation, as component 4 held in head stock 3 oscillates against component 6 held in tail stock 5 to create HAZ 12, friction weld 8 is created. In order to obtain the temperature of HAZ 12 and weld 8, a voltage drop is placed across weld 8 by voltage supply 52 and leads 54 and the current in voltage supply 52 is measured by conventional current measuring techniques in process controller 60. Leads 54 are attached to components 4,6 by conventional contact techniques. Controller 60 then computes by conventional methods the dynamic electrical resistance in weld 8 in real time during the friction welding process. The effective temperature of weld 8 is calculated by controller 60 using a well known temperature calculation method which is based on the known specific resistance of the materials being welded. The specific resistance as a function of temperature for various materials can be found in a large variety of scientific literature, for example, *Combined Properties of Conductors* by Avraham Tslaf, published by Elsevier Scientific Publishing Company, 1981. Once the temperature of weld 8 is determined during a particular part of the welding process, that temperature can be compared to the desired temperature to see if the desired temperature is reached. For example, when friction welding titanium, it is desired that the weld reach a temperature of approximately 1600°-1800° F. If controller 60 shows that the temperature of weld 8 is only 1200° F., then the welding process can be modified, for example, by increasing the oscillation rate of head stock 3.

Also, controller 60 can also be used to heat up HAZ 12 in order to form weld 8 more quickly by using electrical energy in the form of Joule heating. In particular, when apparatus 2 is initially started, voltage supply 52 can be activated which causes current to flow through HAZ 12. Because of the higher specific resistance of the HAZ 12, this current causes HAZ 12 to heat up quicker than HAZ 12 would heat up if only mechanical energy produced by force (F) and a particular frequency were used. In this way, for example, less force (F) and a lower frequency may be used in order to create weld 8.

Finally, controller 60 can be used to control the cooldown of weld 8 by maintaining additional electrical heat. In particular, if the temperature of weld 8 is below a predetermined temperature for a given cooldown time, controller 60 can turn on voltage supply 52 such that a prescribed current flows through weld 8. Because of the high specific resistance of weld 8, weld 8 will begin to heat up as compared to the remainder of the material around weld 8. In this manner, controller 60 can be used to keep the cooldown rate of weld 8 at a desired rate.

Controller 60 can also use through well known feedback techniques, the data on the dynamic resistance or the computed effective temperature of weld 8 as an input variable in the dynamic feedback control system in controller 60 to assure welding repeatability and quality.

In a preferred end use of the control of temperature of HAZ 12, the temperature of HAZ 12 is controlled based upon conventional metallurgical phase diagrams in order to control the metallurgical properties of weld 8. For example, a particular microstructure, yield strength, fatigue or ductility, among other properties, may be desired in weld 8. Control system 50 provides the mechanism to achieve these desired properties.

Once given the above disclosure, many other features, modifications or improvements will become apparent to the skilled artisan. Such features, modifications or improvements are, therefore, considered to be a part of this invention, the scope of which is to be determined by the following claims.

We claim:

1. A friction welding temperature control system having a friction welding means which produces a friction weld, said system comprised of:
    a temperature sensing means electrically attached to said welding means which provides an electrical signal;
    a heating means providing electrical resistance heating; and
    a control means which processes said electrical signal to control said heating means and both heatup and cooldown rate of said friction weld.

2. The system, according to claim 1, wherein said said heating means is further comprised of:
    a power source means having a low voltage and high current.

3. The system, according to claim 2, wherein said control means is further comprised of:
    said power source means;
    a microprocessor means; and
    a dynamic feedback control means.

4. The friction welding temperature control method having a friction welding means, a temperature sensing means, a heating means, and a control means, said method comprised of the steps of:
    operating said welding means;
    initiating said temperature sensing means;
    initiating said heating means;
    observing and recording a friction welding cooldown temperature through said temperature sensing means and said control means; and
    controlling friction welding cooldown temperature by said heating means and said control means.

5. The control method, according to claim 4, wherein said step of initiating said heating means is further comprised of the step of:
    operating a power supply means to supply a low voltage and a high current to said friction welding means.

6. The control method, according to claim 5, wherein said step of observing and recording said friction welding temperature is further comprised of the steps of:
    applying a voltage from said power source;
    determining a current;
    transmitting said voltage and said current to said control means to compute a resistivity in said weld;
    determining a friction welding temperature; and
    determining an effective cooldown rate in said weld in said control means.

7. The measurement and control method, according to claim 6, wherein said step of controlling said friction welding temperature is further comprised of the steps of:
    determining a desired friction welding cooldown temperature rate; and adjusting said power source so as to make said effective cooldown rate substantially coincide with said desired cooldown rate.

8. A control system for controlling a friction welding means which produces a friction weld in a prescribed manner to produce desired metallurgical properties in a weld based upon metallurgical phase diagrams, said system comprising:

a temperature sensing means electrically attached to said welding means which provides an electrical signal;

a heating means providing electrical resistance heating; and a control means which processes said electrical signal to control both heatup and cooldown rate of said friction weld.

* * * * *